Examiner

BEST AVAILABLE COPY

Sheet 1-4 Sheets.

A. A. Croll,

Gas Meter,

No. 610. Reissued Oct. 5. 1858.

N. PETERS. PHOTO-LITHOGR

EXAMINER'S ROOM

A. A. Croll,

Gas Meter.

Sheet 2 - 4 Sheets.

No. 610.

Reissued Oct. 5, 1858.

N. PETERS, PHOTO-LITHOGRAPHER, WASHINGTON, D. C.

Sheet 3 - 4 Sheets

A. A. Croll,

Gas Meter.

No. 610. Reissued Oct. 5, 1858.

M. PETERS, PHOTO-LITHOGRAPHER, WASHINGTON, D. C.

Sheet 4. 4 Sheets

A. A. Croll

Gas Meter.

No. 6,10.

Reissued Oct. 5. 1858.

N. PETERS, PHOTO-LITHOGRAPHER, WASHINGTON, D. C.

UNITED STATES PATENT OFFICE.

ALEXANDER ANGUS CROLL, OF LONDON, ENGLAND.

IMPROVEMENT IN DRY GAS-METERS.

Specification forming part of Letters Patent No. 9,591, dated February 22, 1853; Reissue No. 610, dated October 5, 1858.

*To all whom it may concern:*

Be it known that I, ALEXANDER ANGUS CROLL, of the city of London, in the Kingdom of England, consulting gas engineer, have invented certain new and useful Improvements in Dry Meters for Regulating and Registering the Flow of Gas, of which the following is a full, clear, and exact description, reference being had to the accompanying drawings, which form part of this specification, and in which—

Figure 1:
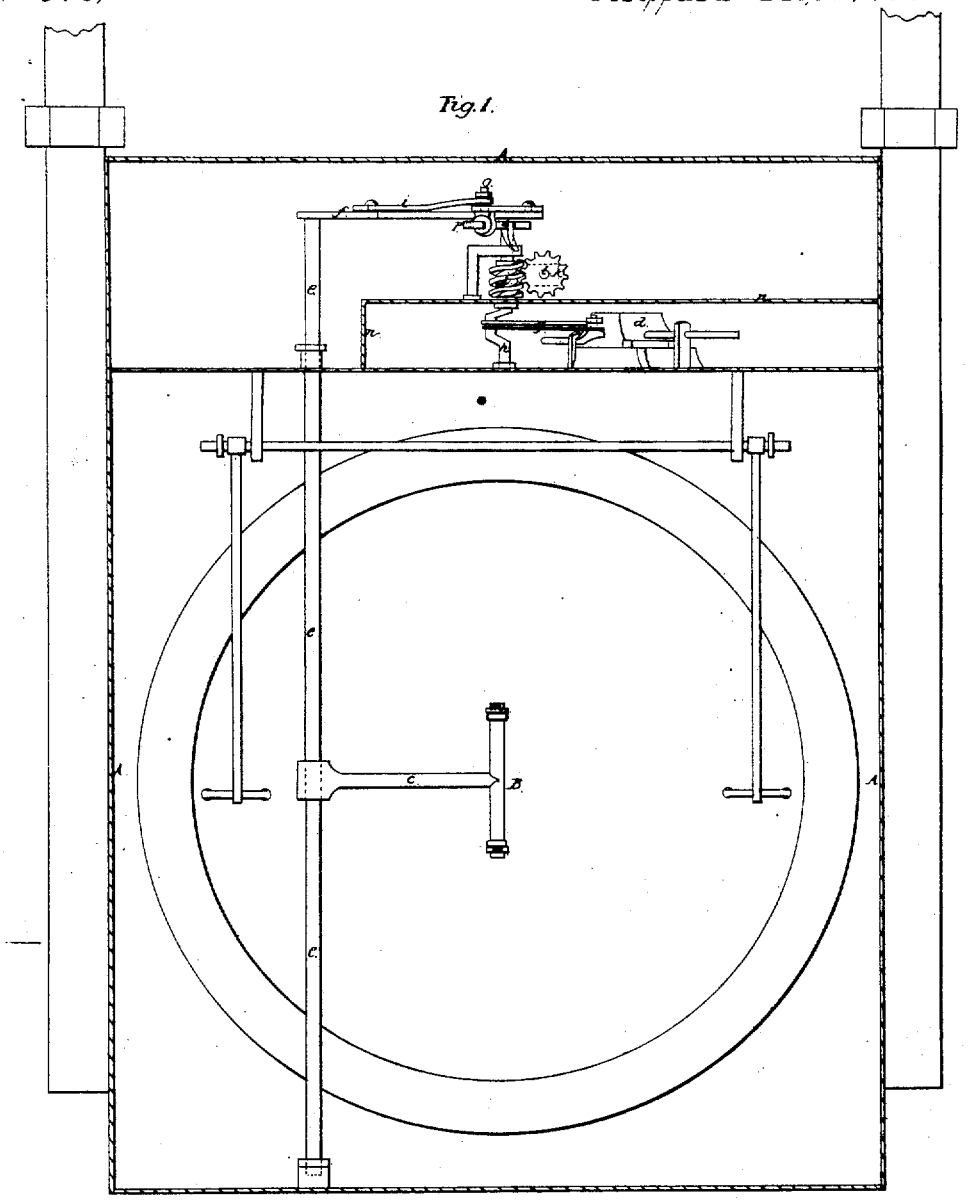
Figure 4:
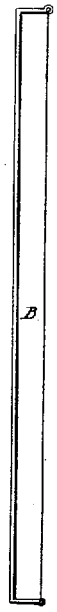
Figure 3:
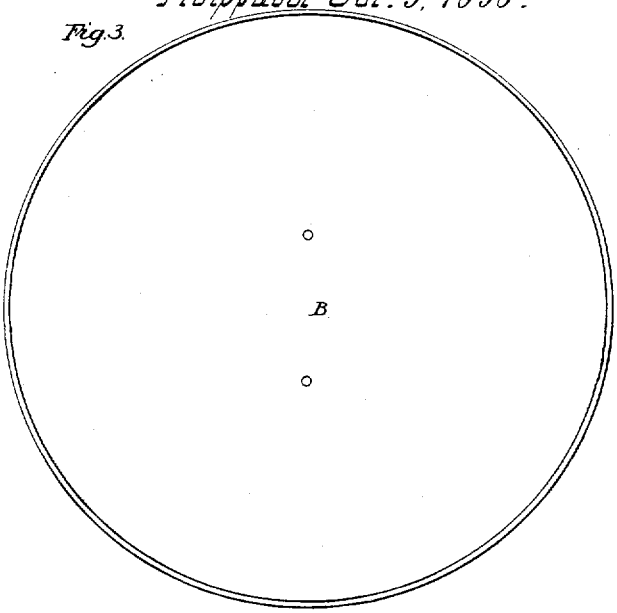
Figure 5:
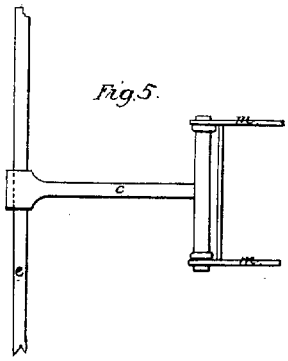
Figure 2:
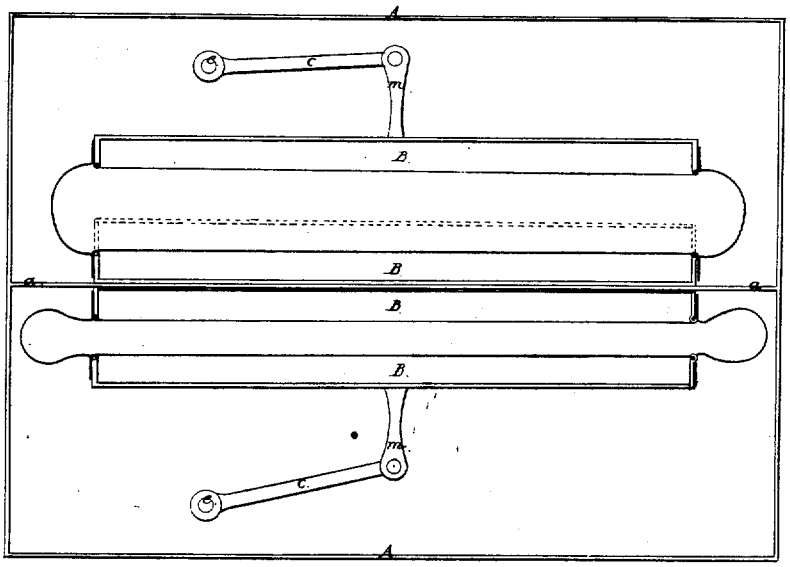
Figure 6:
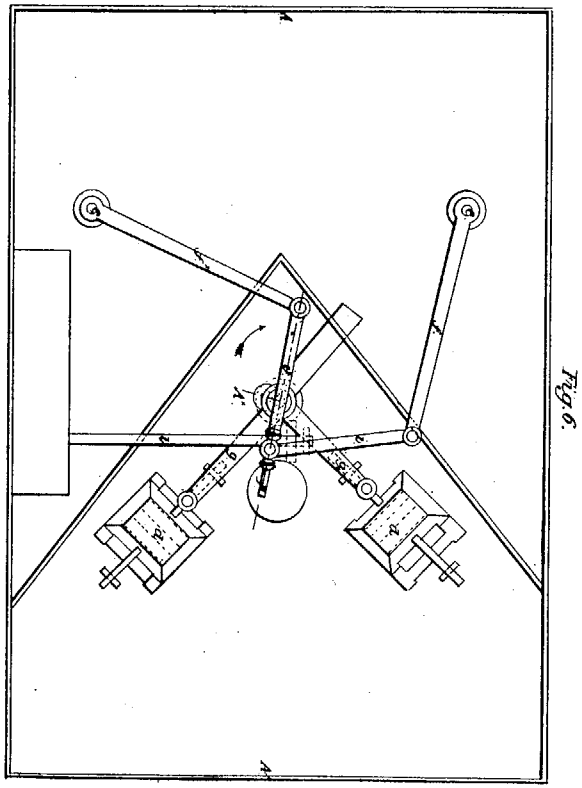
Figure 7:
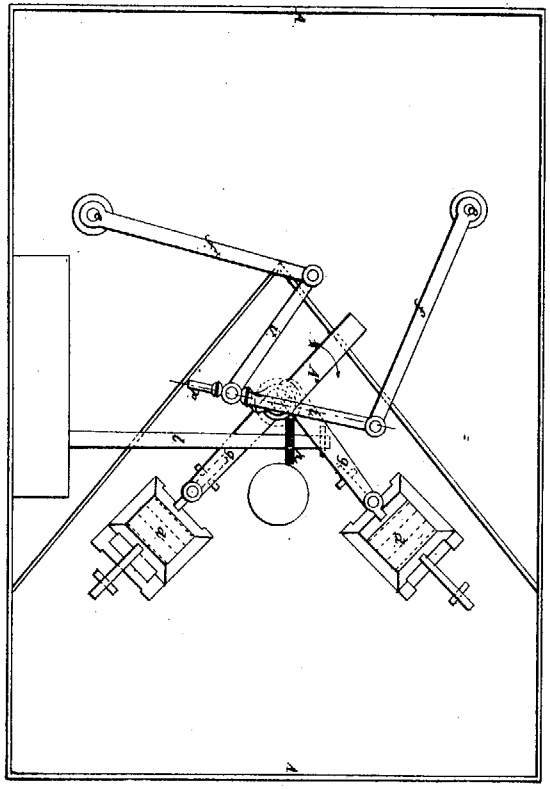
Figure 8:
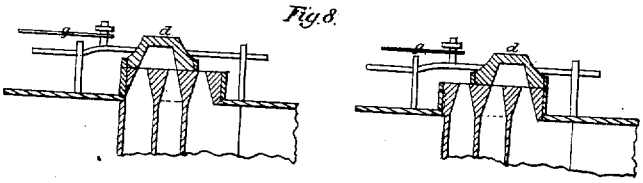
Figure 9:
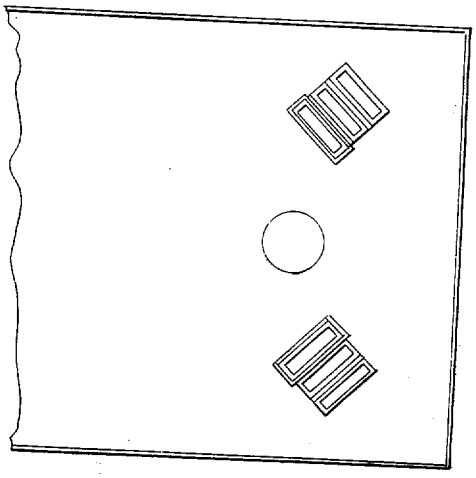
Figure 10:
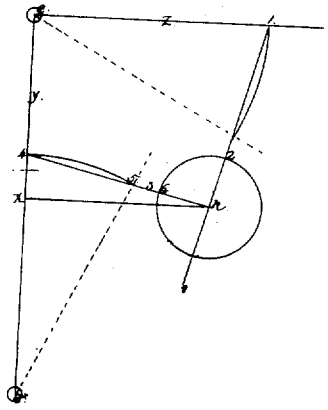

Figure 1, Sheet A, represents a vertical section of a gas-meter having two partitions moving on flexible connections; Fig. 2, a horizontal section thereof; Figs. 3 and 4, a plan or face and edge view of the dished metal plate, to which the flexible material employed is applied; and Fig. 5, a detailed view showing the form of the arm which is affixed to the plates B B. Figs. 6 and 7, Sheet B, represent two plans of the upper part of the meter, showing the arrangement of valves and parts working the same in different positions; Fig. 8, two sections of the valves in their two positions; Fig. 9, a plan of the under side of the valve seats; and Fig. 10 a diagram explaining an arrangement of the arms and connecting-rods which operate the crank-shaft of the meter from the to-and-fro movement of the two moving partitions, by which arrangement no pulsation or difference is indicated in the burning of the gas, producing flickering of the lights, as is so objectionably and frequently the case in most dry meters having two movable partitions or flexible diaphragms, to which description of meter my improvement relates.

To enable others skilled in the art to make and use my invention, I will proceed to describe its construction and operation.

A A A is the outer case of the meter having two partitions, B B, with moving flexible edges, and which, by means of the arms *c c* and parts hereinafter explained, give motion to the slide-valves *d d*$^{\times}$, and to the wheel-work for registering the quantity of gas which has passed through the meter. The flexible edges or diaphragms of the plates B B, it will be seen, are not fastened to the sides of the meter, but to the partition-plate *a*, which not only is a more compact arrangement, but forms a central and single attachment for the two moving partitions working in unison, and does away with inequality arising from separate and distant points of attachment produced, say, by injury to either side of the meter or deflection of either side.

On the axial shafts *e e* of the arms *c c* are affixed arms *f f*$^{\times}$, one to each shaft, such arms being connected to the crank-shaft *h* by means of connecting-rods *i i*, which are united by pin-joints at one end to the arms *f f*$^{\times}$, and at their other end to the crank-pins *o* of the crank P on the crank-shaft *h*, which shaft has a screw or worm, *j*, that gives motion to the worm-wheel *k* on a shaft, *l*, communicating with the requisite tram of wheels for registering the quantity of gas which has been transmitted through the meter. I have not thought it necessary to show the train of wheels for that purpose, as the same is well understood. The two partitions are placed and worked in separate compartments of the meter, as shown at *a*, Fig. 2, the flexible partition dividing each of the compartments into two parts, and the valve being so arranged as alternately to admit the gas to and from either side of each flexible partition. The partitions not passing the points of their fixture on either side, the flexible material used is not liable to crack or be quickly injured by the crossing and bending of the flexible material first on one side and then on the other, which, being very objectionable on such account, and to secure accuracy in measuring gas in dry meters, it is best to avoid this crossing action of the diaphragm and to employ as large a disk of metal surrounded by as narrow a margin of flexible material as possible.

The range of movement of the plates B B is shown in Fig. 2, and the drawings also show the parts so arranged that the flexible material can only be bent in one direction.

The guides for directing the motion of the disks in a straight line or thereabouts are arranged, it will be seen by reference to Fig. 1 of the drawings, near the outer periphery of each disk, which keeps the disks much more steady in their movements backward and forward than a parallel motion at or round the eye of the disks would do, and by dispensing with a complicated parallel motion and its number of joints, using simple pendent rods on either side, I do away with much friction, liability to derangement, and diminish cost.

The arms *c c* are attached to the disks B B by short arms *m m*, projecting from the face of the plates or disks, in order to give motion to the valves and wheel-work for registering the gas.

Upon reference to the drawings it will be seen that that portion of the meter containing the valves and their connecting-rods is inclosed by a cover or partition, *n n*. Such arrangement protects the operating-arms, tangent crank, spindle, screw, and worm-wheel and bridge from the action of the gas, thereby rendering the meter much easier to repair and adjust the registration of it. The meter being made of rectangular shape admits of a large upper chamber being provided in it in which to arrange the valves, long or powerful operating-arms and their connections, and does away with a complicated arrangement of chambers beneath the valves to convey the gas into the body of the meter. Liability to leakage underneath the valve-grating is lessened. The inlet and outlet pipes I arrange at the sides of the meter and continue them to a point below their necessary junction for passage of the gas in order that they may form separate chambers for condensed gas, if any to collect.

As it is of importance in constructing gas-meters with two movable partitions giving motion to two shafts—such as *e e*—that there should be an equality of delivery of the gas so as not to produce a flickering of the lights, I prefer to construct the arms $f f^{\times}$ and connecting-rods *i i*, by which motion is communicated to the shaft working the valves and train of wheels, according to the following rule, reference being had to the diagram, Fig. 8: The distance apart of the shafts *c c* being determined for a meter, also the mode of ascertaining the throw of the crank being determined, the mode of obtaining the length of the arms $f f^{\times}$ and the connecting-rods *i i*, in order that they may be adapted to the arrangement here shown, I proceed first to determine where the shaft *h* shall be placed, and I prefer that it should be on a line, *x*, Fig. 10, raised perpendicular to the line *y*, drawn from *e e*, and that the center of the shaft *h* should be at a distance from the line *y* equal to one half the length of the line *y*—that is, equal to the line *a e*; but this distance of the shaft *h* from the line *y* is not absolute, but preferable, as by such means the arms $f f^{\times}$ and rods *i i* become equal or nearly equal. Describe a circle about *h*, equal to the motion of the crank-pin *o*, then raise a line, Z, on the line *y* from *c*, after which having marked on a straight-edge, the diameter of the circle about the center *h*, place said straight-edge on the paper, and move it so that the outer marked point may be retained on the line Z while the edge of the straight-edge rests against the point *h*, as is indicated by the line 1 1, till an arc of a circle, the center of which is *e*, is obtained on the line 1 1, equal to the diameter of the circle about *h*, and the length of the line *e* 1 will be the length of the arm *f*, and the length of the line 1 to 2 will be the length of the connecting-rod *i*, and having thus obtained the length of the parts *f i* for the one shaft *e*, the length of the parts $f^{\times}$ and $i^{\times}$ are obtained as follows: Draw a line, 3, perpendicular to the line 1 1, and upon that line place the edge of a straight-edge upon which is marked the diameter of a circle about the shaft *h*, (indicated by 4 and 5,) and move the same along the line 3 until an arc of a circle is obtained from the shaft $e^{\times}$, which arc will intersect the points 4 and 5, then the distance from the shafts $e^{\times}$ to the point 4 will be the length of the arm $f^{\times}$, and the distance from the point 4 to the point 6 will be the length of the connecting-rod $i^{\times}$.

I prefer that the crank on the shaft *h*, which moves the rods *g g*, be so arranged that when the central line of a rod, $i^{\times}$, is coincident with the line of the crank the valve *d* of that rod is not quite closed, and the same state of circumstances should occur in respect to the other rod *i* and its valve, as is indicated by the red line $A^{\times}$ in Figs. 6 and 7, in which the center of the crank moving the rods *g* is shown little behind the red line $A^{\times}$.

Having thus fully described my said improvements, what I claim as my invention, and desire to secure by Letters Patent, is—

1. Fastening the diaphragms to the partition-plate and on either side thereof, in contradistinction to attaching them by separate flange-rings to the sides of the meter and at or near the front and back thereof.

2. The arrangement of pendent rods or levers with suitable guides near the outer edges of the disks on opposite sides of their axes, to steady and direct the motion of the movable partitions, as shown and described.

3. Continuing the inlet and outlet pipes down the sides of the rectangular case below the points required for passage of the gas to and from the meter, to form separate condensation-chambers, as specified.

4. Inclosing by a separate interior cover or case the valves of the meter for protection of the operating and registering gear from gas and to facilitate adjustment, substantially as set forth.

In testimony whereof I have signed my name to this specification before two subscribing witnesses.

A. AG. CROLL.

Witnesses:
J. D. DUFF,
C. B. DUFF.